United States Patent
Ceccarelli et al.

(10) Patent No.: US 10,554,537 B2
(45) Date of Patent: Feb. 4, 2020

(54) SEGMENT ROUTING IN A MULTI-DOMAIN NETWORK

(71) Applicant: Telefonaktiebolaget LM Ericsson (publ), Stockholm (SE)

(72) Inventors: Daniele Ceccarelli, Stockholm (SE); Diego Caviglia, Stockholm (SE); Paolo Rebella, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 68 days.

(21) Appl. No.: 15/328,653

(22) PCT Filed: Jul. 24, 2014

(86) PCT No.: PCT/EP2014/065901
§ 371 (c)(1),
(2) Date: Jan. 24, 2017

(87) PCT Pub. No.: WO2016/012043
PCT Pub. Date: Jan. 28, 2016

(65) Prior Publication Data
US 2017/0230276 A1    Aug. 10, 2017

(51) Int. Cl.
*H04L 12/715* (2013.01)
*H04L 12/723* (2013.01)

(52) U.S. Cl.
CPC ............. *H04L 45/04* (2013.01); *H04L 45/50* (2013.01); *H04L 45/64* (2013.01)

(58) Field of Classification Search
None
See application file for complete search history.

(56) References Cited

U.S. PATENT DOCUMENTS

2014/0098675 A1    4/2014  Frost et al.
2014/0101335 A1    4/2014  Filsfils et al.
(Continued)

FOREIGN PATENT DOCUMENTS

WO    WO 2014055968    4/2014

OTHER PUBLICATIONS

Problem Statement and Architecture for Information Exchange Between Interconnected Traffic Engineered Networks; Network Working Group; Internet-Draft; Intended status: Standards Track; A. Farrel et al.; Expires: Sep. 3, 2014-Mar. 3, 2014.
(Continued)

*Primary Examiner* — Huy D Vu
*Assistant Examiner* — Hong Shao
(74) *Attorney, Agent, or Firm* — Baker Botts, LLP

(57) ABSTRACT

The present invention provides a method for enabling Segment Routing in a multi-domain network comprising a client network domain and a server network domain, where the client network domain is a packet network domain and the server network domain is a connected-oriented network domain. The method comprises assigning a network segment identifier to each of one or more potential paths through the server network domain between a pair of overlay network nodes in the client network domain, wherein the one or more potential paths are not pre-configured and the or each network segment identifier is suitable for inclusion in one or more data packets to indicate to at least one of the pair of overlay network nodes a preselected network segment routing for the one or more data packets. The present invention further provides a method for routing data packets in the multi-domain network. The method, in an overlay network node in the client network domain, comprises receiving one or more data packets, and retrieving a network segment identifier included in at least one of the one (Continued)

or more data packets. The method further comprises determining that the network segment identifier indicates that the one or more data packets should be routed over a pre-selected potential path through the server network domain, and, based on the determining, triggering the server network domain to configure the pre-selected potential path through the server network domain.

15 Claims, 10 Drawing Sheets

(56) References Cited

U.S. PATENT DOCUMENTS

| | | | |
|---|---|---|---|
| 2014/0169370 A1* | 6/2014 | Filsfils | H04L 69/166 370/392 |
| 2015/0244463 A1* | 8/2015 | Ravindran | H04B 10/27 398/58 |

OTHER PUBLICATIONS

Segment Routing Use Cases; Network Working Group; Internet-Draft; Intended status: Standards Track; C. Filsfils, Ed. et al.; Expires Dec. 30, 2013-Jun. 28, 2013.

The Use Cases for Using PCE As The Central Controler (PCECC) of LSPs; PCE Working Group; Internet-Draft; Intended status: Standards Track; Quintin Zhao et al.; Expires: Jan. 5, 2015-Jul. 4, 2014.

International Search Report for International application No. PCT/EP2014/065901—dated Apr. 13, 2015.

* cited by examiner

IGP NODE SEGMENT

ADJACENCY SEGMENT

SEGMENT ROUTING IN A MULTI-DOMAIN NETWORK

PRIORITY

This nonprovisional application is a U.S. National Stage Filing under 35 U.S.C. § 371 of International Patent Application Serial No. PCT/EP2014/065901 filed Jul. 24, 2014, and entitled "Segment Routing In A Multi-Domain Network."

TECHNICAL FIELD

The present invention relates to a method and apparatus for enabling Segment Routing, SR, in a multi-domain network. The present invention further relates to a method and apparatus for routing data packets in a multi-domain network, a network node, a computer program and a computer program product.

BACKGROUND

Segment Routing, SR, is an emerging technology which may be used in both IP and MPLS packet networks and which may be used in both a distributed control plane environment (e.g. IP/MPLS control plane) and in a centralised control plane environment (e.g. SDN, Software Defined Networking).

Segment Routing, as defined by the IETF, enables enhanced packet routing, offering the ability to provide strict network performance guarantees whilst making more efficient use of network resources and providing greater scalability than other label-switched routing technologies which require a signalling protocol, for example RSVP-TE (Resource Reservation Protocol-Traffic Engineering), to pre-configure end-to-end paths for data packets.

SR is based on two concepts: Node Segment and Adjacency Segment. As illustrated in FIG. 1 in respect of node Z 25, in Node Segment, each node 25 in a packet network 20 is assigned a global, unique Segment identifier (e.g. a label), which is stored in the Segment Routing data plane of each of the other nodes 25 in the network 20. As indicated in FIG. 1, in this example, node Z 25 is assigned Segment identifier 65. When a packet is injected at any of the other nodes 25 in the network 20 with this Segment identifier, 65, then that node 25 will forward the packet to node Z 25, via an ECMP (Equal-Cost Multi-Path) aware shortest path. In contrast, in Adjacency Segment, a Segment identifier is assigned to a pre-selected path from a first node 25 to a second node 25 in the network 20, and this Segment identifier is stored in the Segment Routing data plane of the first node 25 only. Thus, it should be appreciated that this Segment identifier does need to be a globally unique identifier. As illustrated in FIG. 2, by way of example, Adjacency Segment identifier 9003, stored at node C 10, indicates that a packet received at node C 10 having that Segment identifier, should be routed though the link CF to node F 10.

A path computation entity (e.g. a PCE or an SDN packet network controller) determines an end-to-end path for data packets across the packet network, and encodes this path as a set of ordered labels. Each label, as explained above, identifies a segment of the path, and defines the characteristics of that segment. The set of labels is then sent to the ingress network node, which includes the labels in the header of the data packets. The ingress network node reads the outer or uppermost label, and routes the data packets accordingly over the identified network segment to a further network node. The further network node drops the uppermost label, reads the next label and routes the data packets accordingly over the identified network segment and so on, until the data packets reach the egress network node.

Thus, Segment Routing provides an advantageous way of routing data packets over a packet network.

SUMMARY

The Applicant has appreciated that it would be desirable to provide a method for enabling segment routing in a multi-domain network comprising a client network domain and a server network domain, where the client network domain is a packet network domain and the server network domain is a connected-oriented network domain. For example, the server network domain may be one of an optical network, an Optical Transport Network, OTN, a Synchronous Digital Hierarchy, SDH, network or a connection-oriented packet network.

At present, the only way to use Segment Routing to route data packets through a multi-domain network, for example comprising a server packet network and an client optical network, is to preconfigure paths through the server network between pairs of overlay network nodes in the client packet network, manually or with the help of a control plane, such that a packet link between those nodes is pre-established, which may be indicated for example by an Adjacency Segment identifier.

For example, the GMPLS UNI control plane provides an interface between a client packet network and a server optical network. The GMPLS UNI control plane has two control models: the signalling control model (also known as UNI+) and the potential paths control model (also known as UNI).

In the signalling control model, as illustrated in FIG. 3, the client packet layer 20 can ask a server optical layer 30 to configure a path between a pair of overlay network nodes 25 in the packet layer 20 with given constraints (e.g. Objective Functions, TE metric bounds). The client packet layer 20 then collects the set of parameters characterising the path (e.g. latency, SRLG) from the server optical layer 30. In the potential paths control model, on the other hand, as illustrated in FIG. 4, the server optical layer 30 computes a set of potential paths between any pair of edge nodes in the optical layer 30. These paths are not pre-configured, and so may share potential network resources with other potential paths. Such paths are then advertised by each optical border node 35 to its peering border (i.e. overlay) packet node 25. The overlay packet node 25 can then, at a subsequent time, pick the path which best fits its traffic requirements and ask the optical border node 35 to set up, i.e. to configure, the path, whereby network resources are allocated to the path. For example, referring to FIG. 4, it is seen that at time T0, there are three potential paths from optical node S1 35, which borders overlay packet node R2 10, to optical node S5, which borders overlay packet node R5. Each of the potential paths may offer different network service parameters.

However, the Applicant has appreciated that a problem with the above way of using Segment Routing in a multi-domain network is that, since paths through the server network must be pre-configured, network resources must be pre-allocated to those paths. Thus, this may make inefficient use of the server network's resources.

According to the present invention, there is provided a method for enabling segment routing in a multi-domain network comprising a client network domain and a server network domain, where the client network domain is a packet network domain and the server network domain is a connection-oriented network domain. The method comprises assigning a network segment identifier to each of one or more potential paths through the server network domain between a pair of overlay network nodes in the client network domain. The one or more potential paths are not pre-configured. The or each network segment identifier is suitable for inclusion in one or more data packets to indicate to at least one of the pair of overlay network nodes a preselected network Segment Routing for the one or more data packets.

The step of assigning a network segment identifier to each of one or more potential paths through the server network domain between a pair of overlay network nodes in the client network domain may comprise receiving an indication of one or more potential paths through the server network domain between a pair of overlay network nodes in the client network domain. The step may further comprise assigning a network segment identifier to each of the indicated one or more potential paths.

The method may further comprise informing at least one of the pair of overlay nodes in the client network domain of the network segment identifier assigned to each of the one of more potential paths through the server network domain.

According to the present invention, there is further provided a method for routing data packets in a multi-domain network comprising a client network domain and a server network domain, where the client network domain is a packet network domain and the server network domain is a connection-oriented network domain. The method, in an overlay network node in the client network domain, comprises receiving one or more data packets. The method further comprises retrieving a network segment identifier included in at least one of the one or more data packets. The method further comprises determining that the network segment identifier indicates that the one or more data packets should be routed over a pre-selected potential path through the server network domain. The method further comprises, based on the determining, triggering the server network domain to configure the pre-selected potential path through the server network domain.

The step of triggering the server network domain to configure the pre-selected path through the server network domain may comprise sending an instruction to a network node in the server network domain or to a server network domain controller.

The method may further comprise forwarding the one or more data packets over the configured pre-selected potential path.

Thus, advantageously, embodiments of the present invention enable the use of Segment Routing to route data packets through a multi-domain network comprising a packet server layer and a connection-oriented client layer, without having to preconfigure paths through the connection-oriented client layer. Thus, advantageously, client network resources do not need to be pre-allocated to these paths, and more efficient use of client network resources may be achieved The server network domain may be one of an optical network, an Optical Transport Network, OTN, a Synchronous Digital Hierarchy, SDH, network or a connection-oriented packet network.

The or each of the one or more potential paths may be a potential optical Label Switched Path, LSP.

The or each network segment identifier may be a label compatible with Segment Routing.

There is further provided apparatus for enabling Segment Routing in a multi-domain network comprising a client network domain and a server network domain, where the client network domain is a packet network domain and the server network domain is a connection-oriented network domain. The apparatus comprises processing circuitry and a memory, the memory containing instructions executable by the processing circuitry, whereby the apparatus is operative to assign a network segment identifier to each of one or more potential paths through the server network domain between a pair of overlay network nodes in the client network domain. The one or more potential paths are not pre-configured. The or each network segment identifier is suitable for inclusion in one or more data packets to indicate to at least one of the pair of overlay network nodes a preselected network Segment Routing for the one or more data packets.

The apparatus may be comprised within a path computation entity, for example a PCE, and or a network controller, for example a SDN controller.

There is further provided an overlay network node for a client network domain in a multi-domain network comprising a client network domain and a server network domain, where the client network domain is a packet network domain and the server network domain is a connection-oriented network domain. The overlay network node comprises processing circuitry and a memory, the memory containing instructions executable by the processing circuitry, whereby the overlay network node is operative to receive one or more data packets and retrieve a network segment identifier included in at least one of the one or more data packets. The overlay network node is further operative to determine that the network segment identifier indicates that the one or more data packets should be routed over a pre-selected potential path through the server network domain. The overlay network node is further operative, based on the determination, to trigger the server network domain to configure the pre-selected potential path through the server network domain.

There is further provided a computer program configured to perform, when run on a computer, the method described above.

There is further provided a computer program product comprising the computer program. The computer program product may comprise the computer program stored on a non-transitory computer readable medium, or comprise the computer program in any other form such as in the form of a downloadable data signal.

BRIEF DESCRIPTION OF THE DRAWINGS

Embodiments of the present invention will now be described, by way of example only, with reference to the accompanying drawings in which.

DESCRIPTION

Figure 1:
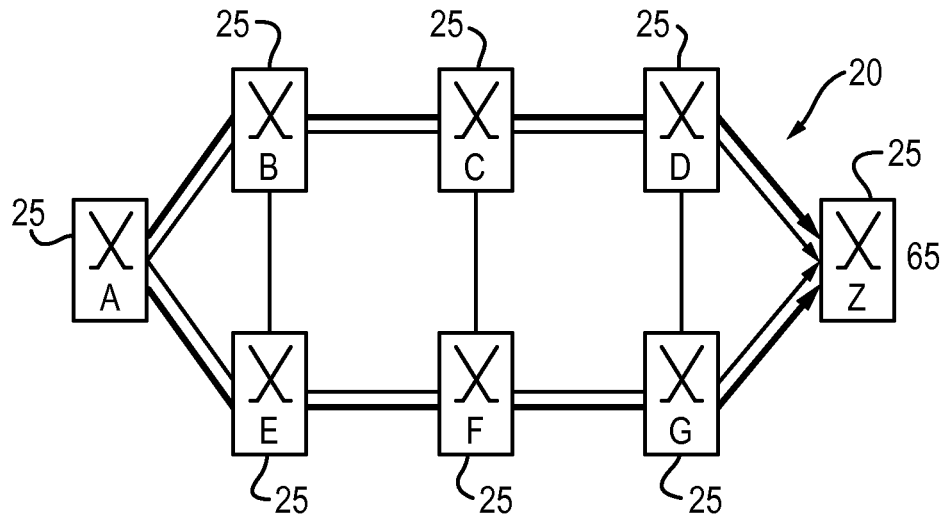
FIG. 1 illustrates an IGP node segment.
Figure 2:
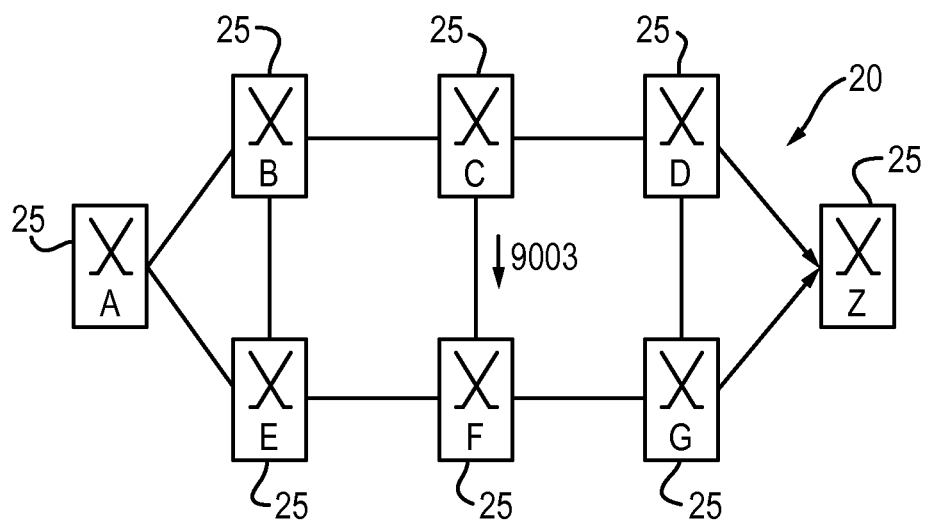
FIG. 2 illustrates an adjacency segment.
Figure 3:
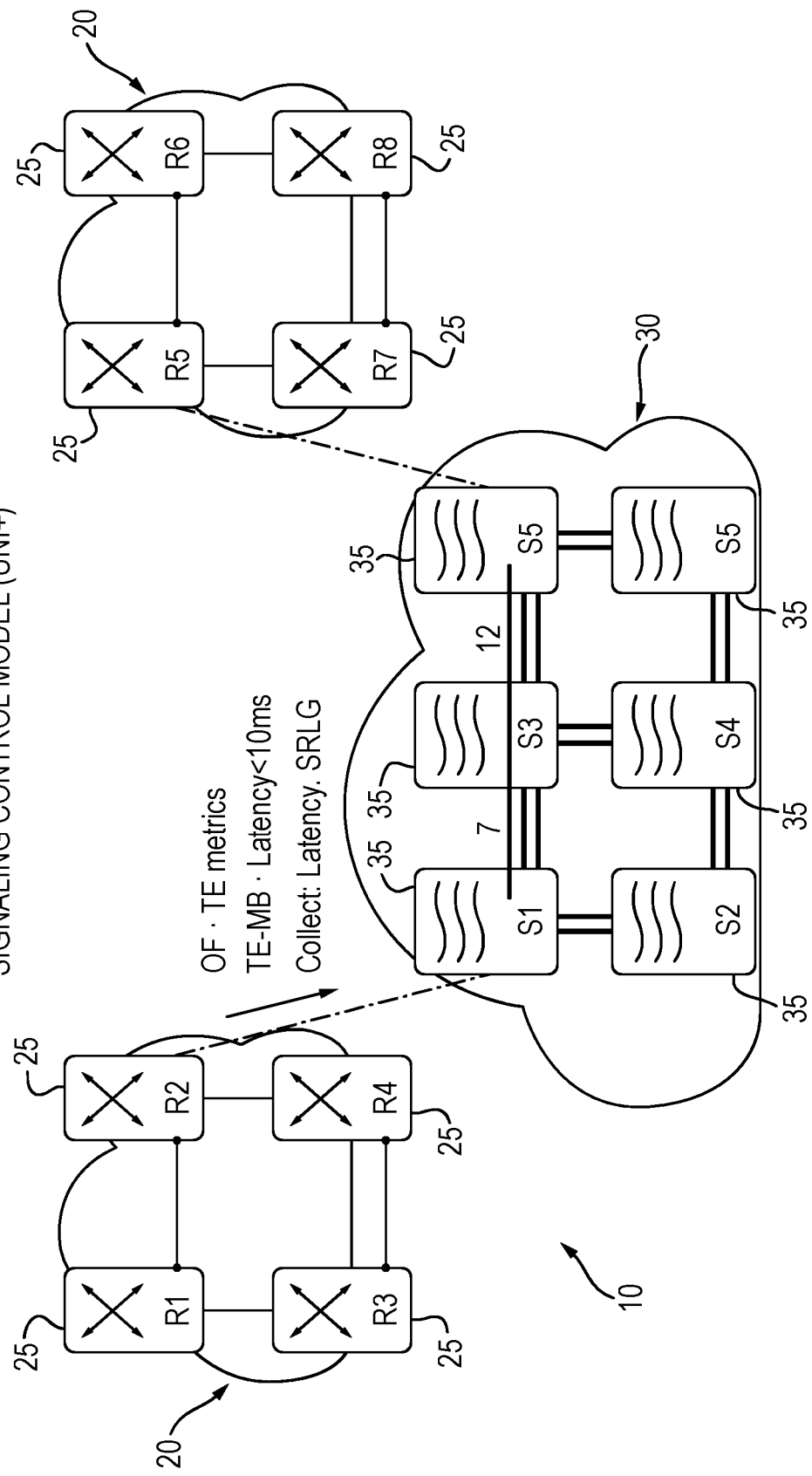
FIG. 3 illustrates the signalling control model (UNI+)
Figure 4:
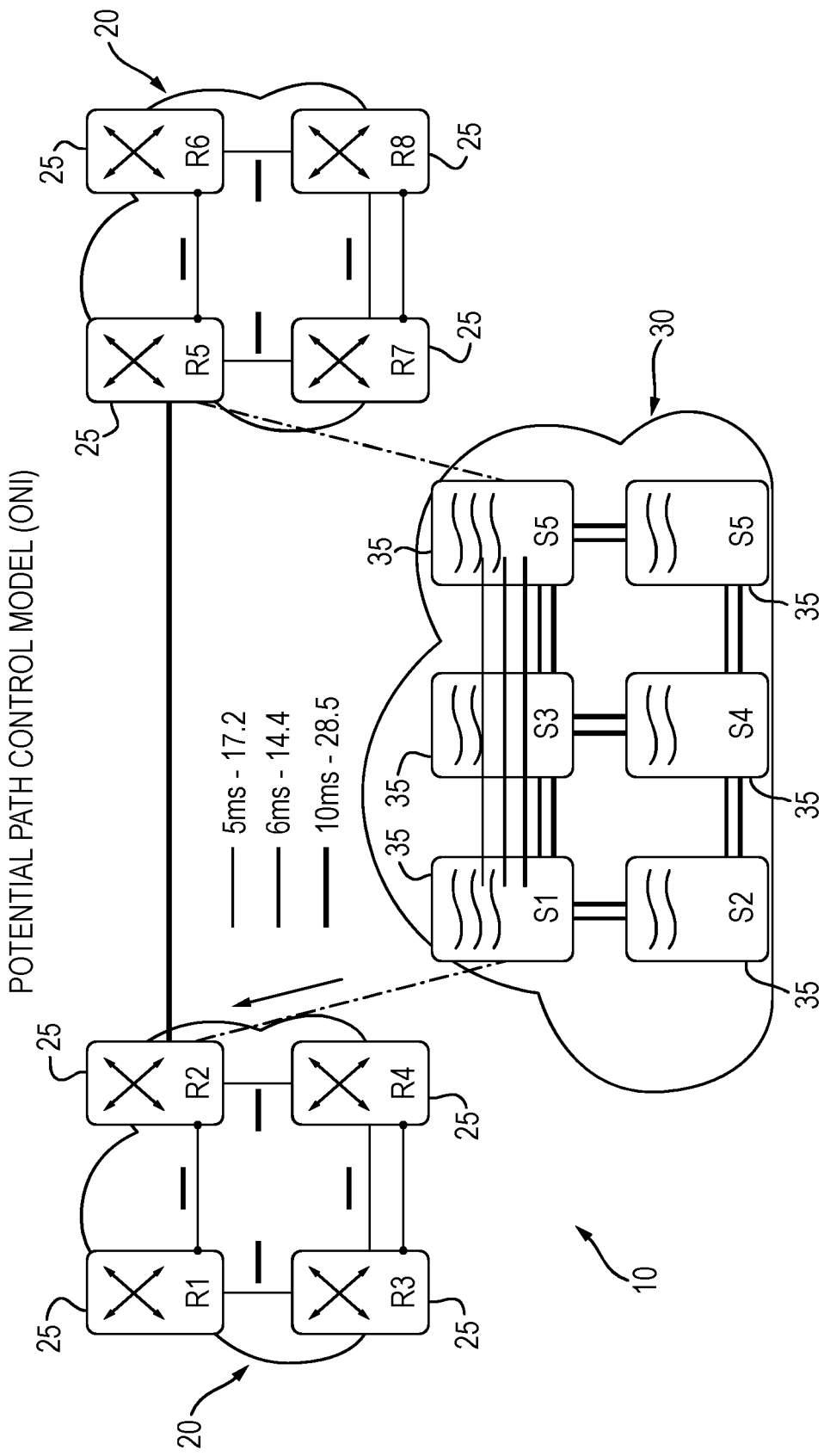
FIG. 4 illustrates the potential path control model (ONI)
Figure 5:
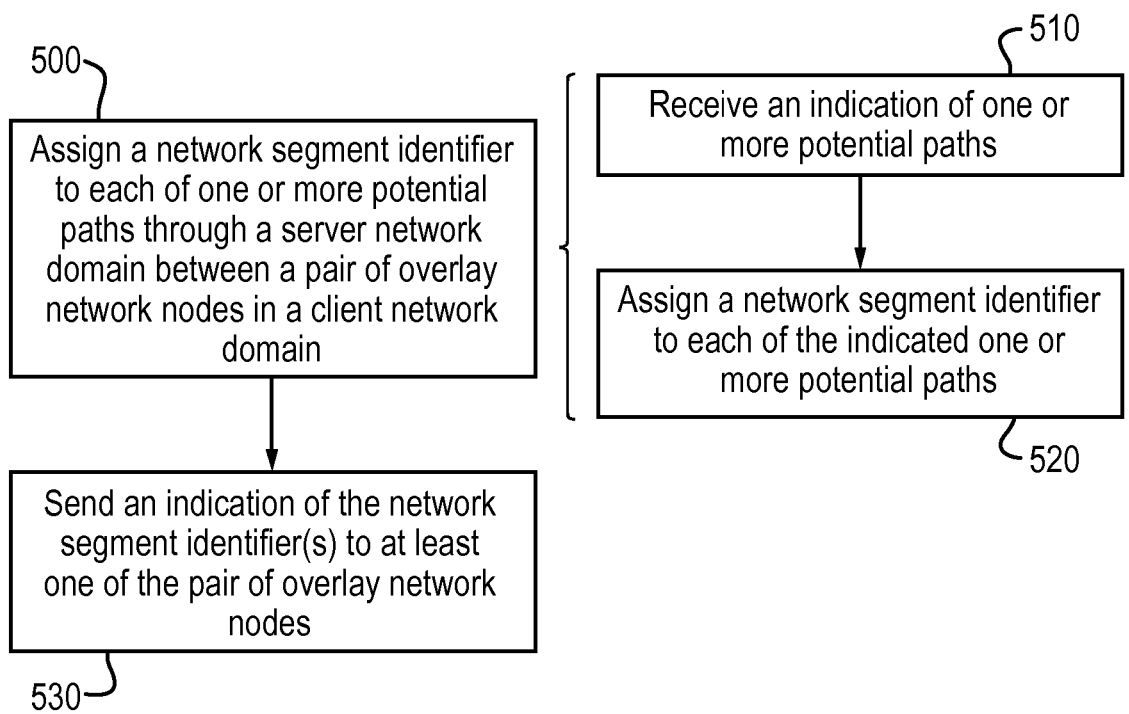
FIG. 5 is a flow chart showing a method according to an embodiment of the present invention.

FIG. 5 is a flow chart showing a method for enabling segment routing in a multi-domain network comprising a client network domain and a server network domain according to a preferred embodiment of the present invention. The client network domain is a packet network domain and the server network domain is a connected-oriented network domain, which may be any one of, for example but not exclusively, an optical network domain, an Optical Transport Network (OTN) network domain, a Synchronous Digital Hierarchy (SDH) network domain or a connection-oriented packet network domain.

The method comprises, at step 500, assigning a network segment identifier to each of one or more potential paths through the server network domain between a pair of overlay network nodes in the client network domain. The one or more potential paths are not pre-configured. Thus, server network resources are not pre-allocated to each path. The or each network segment identifier is suitable for inclusion in one or more data packets to indicate to at least one of the pair of overlay network nodes a preselected network segment routing for the one or more data packets.

Optionally, step 500 may comprise, at step 510, receiving an indication of one or more potential paths through the server network domain between a pair of overlay network nodes in the client network domain and, at step 520, assigning a network segment identifier to each of the indicated one or more potential paths. For example, the indication may be received from one of the overlay packet network nodes or from a different network entity such as a server network controller. Optionally, the method may further comprise, at step 530, informing the at least one of the pair of overlay nodes in the client network domain of the network segment identifier assigned to each of the one or more potential paths, for example by sending an indication of the network segment identifier assigned to each of the one of more potential paths to the at least one of the pair of overlay nodes in the client network domain.

Figure 6:
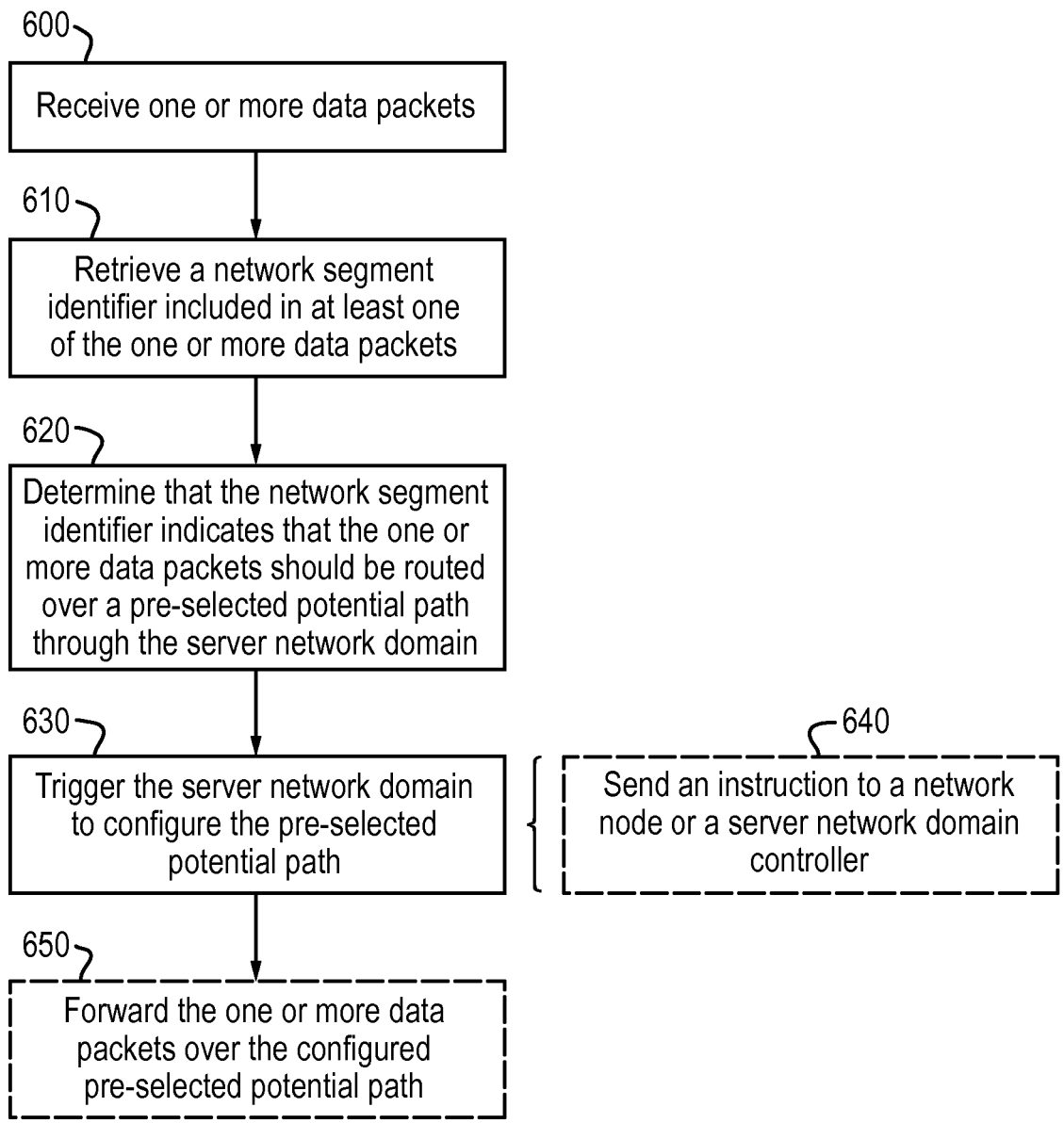
FIG. 6 is a flow chart showing a method according to a further embodiment of the present invention.

FIG. 6 is a flow chart showing a method for routing data packets in the multi-domain network. The method, in an overlay network node in the client network domain, comprises, at step 600, receiving one or more data packets. The method further comprises, at step 610, retrieving a network segment identifier included in at least one of the one or more data packets. The method further comprises, at step 620, determining that the network segment identifier indicates that the one or more data packets should be routed over a pre-selected potential path through the server network domain, to a further overlay network node in the client network domain. The method further comprises, at step 630, based on the determining, triggering the server network domain to configure the pre-selected potential path through the server network domain.

Step 630 may, for example, comprise, at step 640, sending an instruction to a network node in the server network domain, or sending an instruction to a server network domain controller.

The method may further comprise, at step 650, forwarding the one or more data packets over the configured pre-selected potential path.

In order to aid understanding, FIGS. 7 to 10 illustrate a multi-domain network 10 and steps according to a preferred embodiment of the present invention.

In this example, the multi-domain network 10 comprises a client network domain, which is a packet network 20, and a server network domain, which is an optical network 30. However, as indicated above, the server network domain could be any other connection-oriented network domain such as, but not exclusively, an optical network domain, an Optical Transport Network (OTN) network domain, a Synchronous Digital Hierarchy (SDH) network domain or a connection-oriented packet network domain.

In this example, the packet network domain 20 comprises four network nodes 25: R1, R2, R3 and R4. Network nodes R2 and R3 25 are overlay network nodes, which border the server network domain 30. The optical network domain 30 comprises six network nodes 35: S1, S2, S3, S4, S5 and S6.

In this example, the method described above with respect to the flow chart of FIG. 5 is performed in a Path Computation Entity, PCE, 40, which is configured to perform a path computation in the packet network domain 20. This path computation entity may be part of a packet nework controller, e.g. a SDN packet network controller. However, in other embodiments, the method may be performed in a different network entity.

Figure 7:
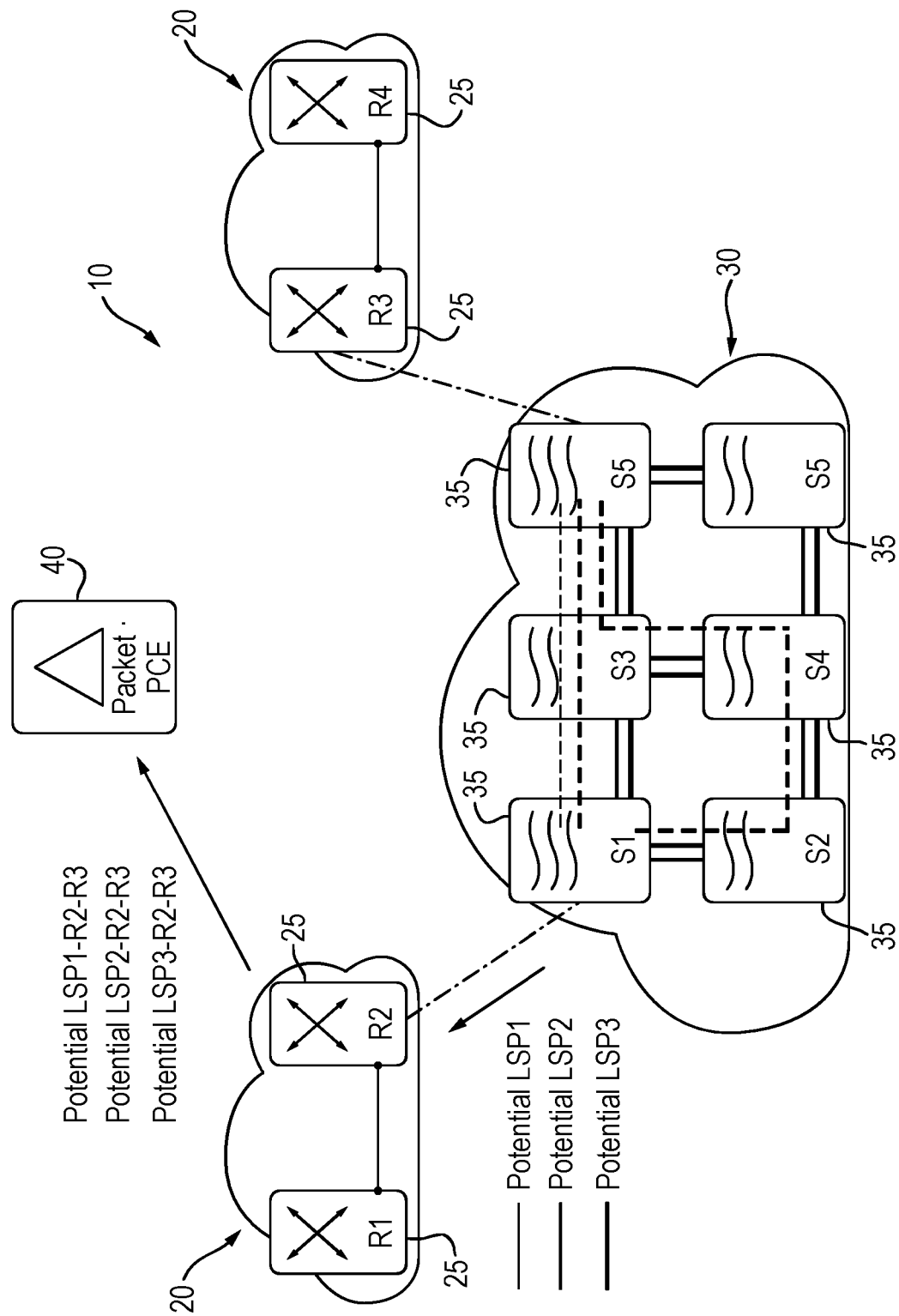
FIG. 7 is a multi-domain network diagram illustrating a step of a preferred embodiment of the present invention.

This preferred embodiment of the present invention makes use of the GMPLS UNI Potential Path Control Model described above. In this example, as shown in FIG. 7, one or more potential optical paths through the optical network 30 are advertised, i.e. indicated, by the border optical node S1 to its peer overlay network node R2. In this example, these potential optical paths are potential LSP (Label-Switched-Paths) optical paths. As seen in FIG. 7, in this example, border optical node S1 indicates that there are three potential LSPs: LSP 1, LSP 2 and LSP 3 between optical nodes S1 and S5. These potential optical paths are not pre-configured. Thus, network resources are not pre-allocated to these potential optical paths. In this example, the overlay network node R2, then sends an indication to PCE 40 that, in this example, there are three potential paths through the server network domain 30 between a pair of overlay network nodes 25 (in this example nodes R2 and R3) in the client network domain 20.

Alternatively, for example where the optical network 30 has an SDN optical network controller rather than a GMPLS controller, it should be appreciated that the SDN optical network controller may send the indication to the PCE 40 or other network entity. Note that, in this embodiment, there may be an integrated multilayer controller which comprises both for example the SDN optical network controller (i.e. an optical engine) and the PCE 40 (i.e. a packet engine). Therefore, this indication may be sent between modules in an integrated device, rather than over a network link.

The PCE 40 assigns a network segment identifier to each of the indicated one or more potential paths between the pair of overlay network nodes 25, here R2 and R3. These network segment identifiers may be referred to as labels. In this example, these labels are compatible with Segment Routing, SR. For example, the labels may be suitable for mapping into MPLS labels. In this example, as shown in FIG. 8, label 20000 is assigned to potential LSP1, label 20001 is assigned to potential LSP2 and label 20002 is assigned to potential LSP3.

Figure 8:
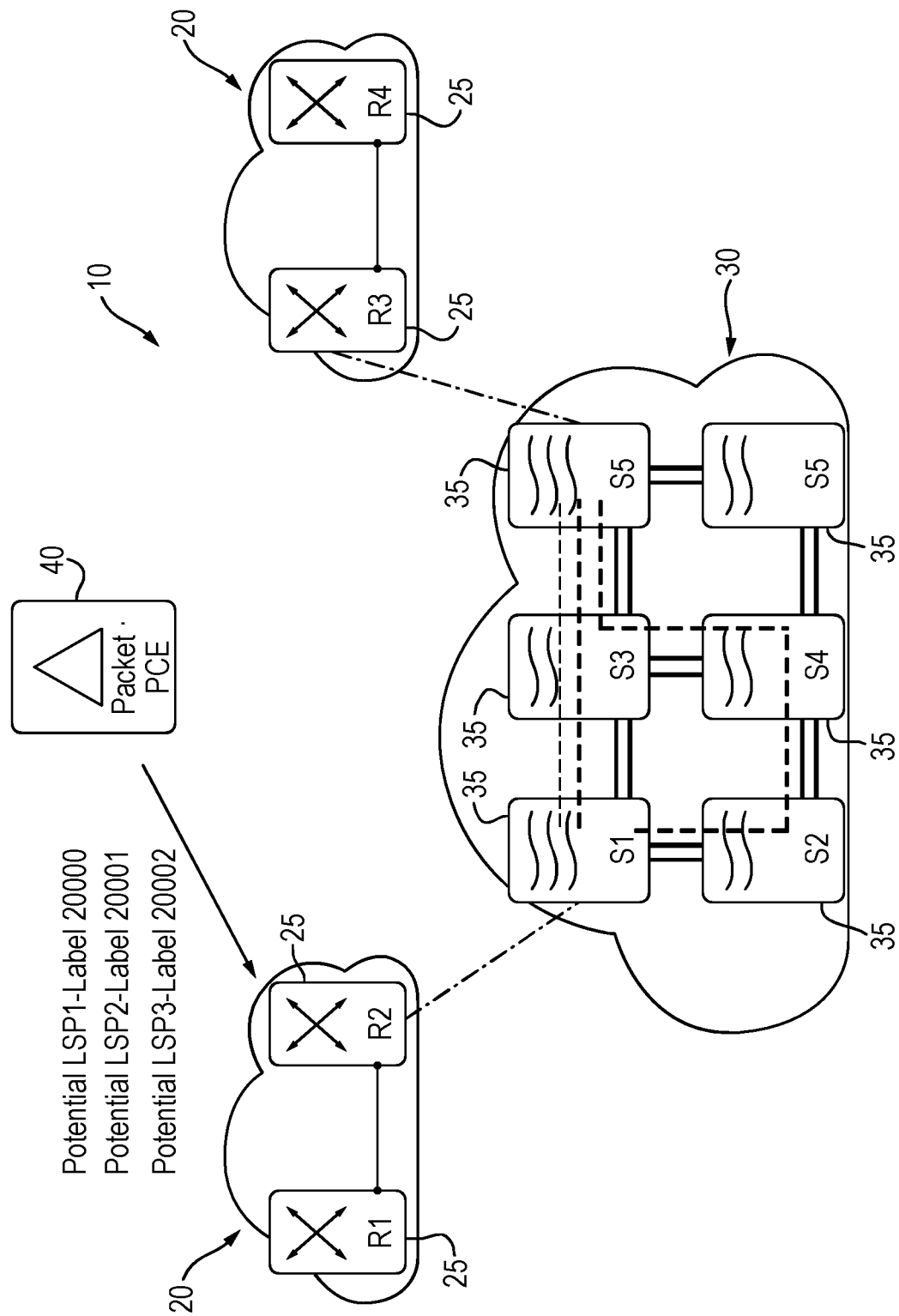
FIG. 8 is a multi-domain network diagram illustrating a further step of a preferred embodiment of the present invention.

In this example, as indicated in FIG. 8, the PCE 40 sends an indication to at least one of the pair of overlay nodes 25 in the client network domain 20 (here node R2) of the network segment identifier(s) assigned to the one of more potential paths. These network segment identifiers may be considered as Adjacency Segment identifiers, and may be stored, for example in the SR data plane of the first overlay network node, R2 25.

However, these network segment identifiers indicate to the first overlay network node 25 (here R2) not only that it should route data packets received having this segment label over the identified potential path through the optical network 30 to overlay node R3 25, but that it should first trigger the set up (i.e. the configuration of) that potential path.

Figure 9:
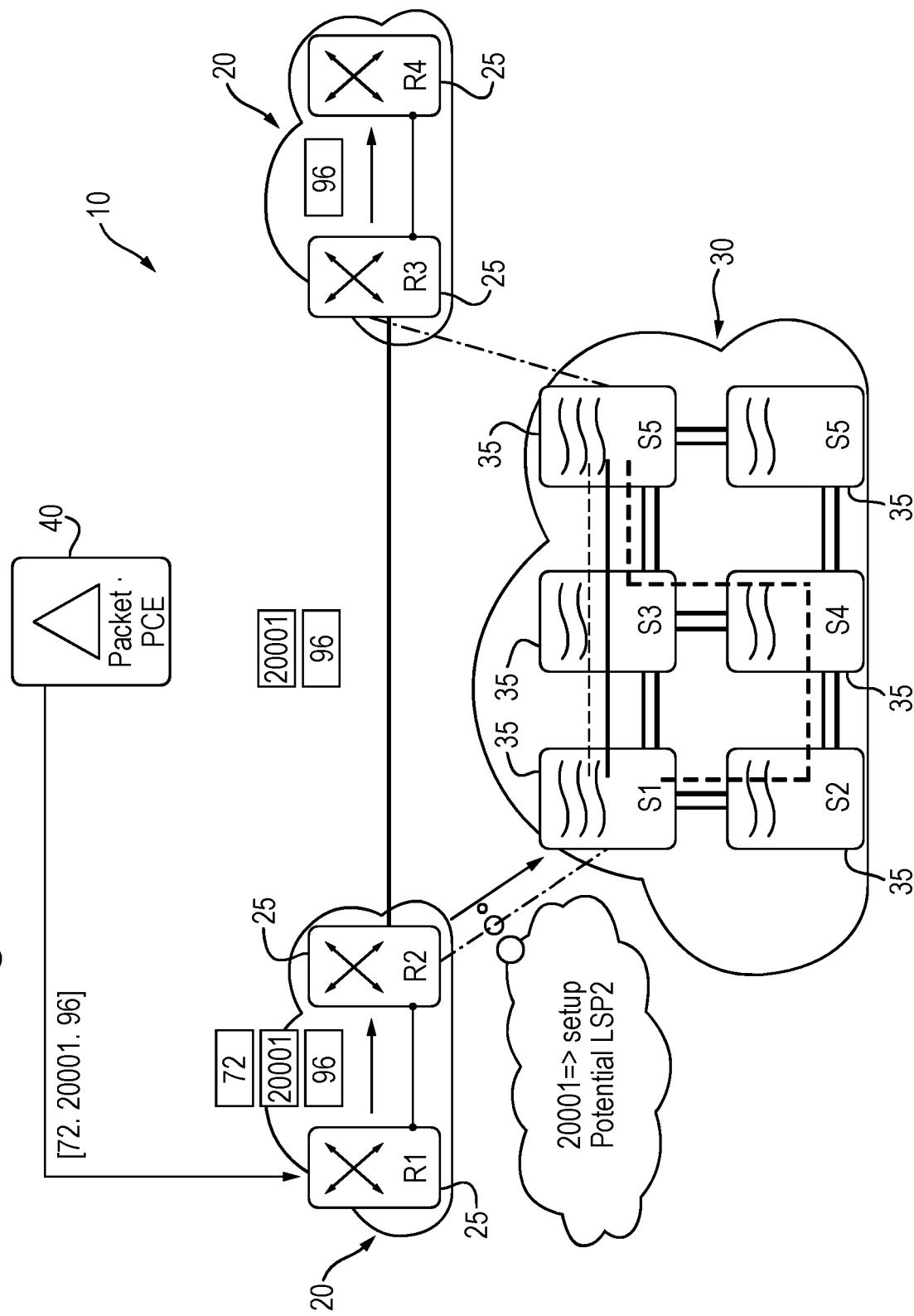
FIG. 9 is a multi-domain network diagram illustrating further steps of a preferred embodiment of the present invention.

The client packet network 20 may implement Segment Routing, SR. By way of example, FIG. 9 shows an example where the PCE 40 computes a path for data packets in the packet network domain 20. This path may be referred to as an end-to-end path. In this example, the path passes through the server network 30, and is determined using knowledge of the one or more potential paths through the server network 30. In this example, the path comprises three network segments. The first and last network segments correspond to real network segments in the packet domain 20, in particular, segments R1 to R2 and R3 to R4 respectively. These segments could be Node Segments or Adjacency Segments. The second network segment corresponds to one of the potential optical paths (in this example LSP 2) through the server optical network 30 between overlay packet nodes R2 and R3 25. This potential optical path may be selected based on traffic engineering considerations at the time of computing the end-to-end path for the data packets.

Figure 10:
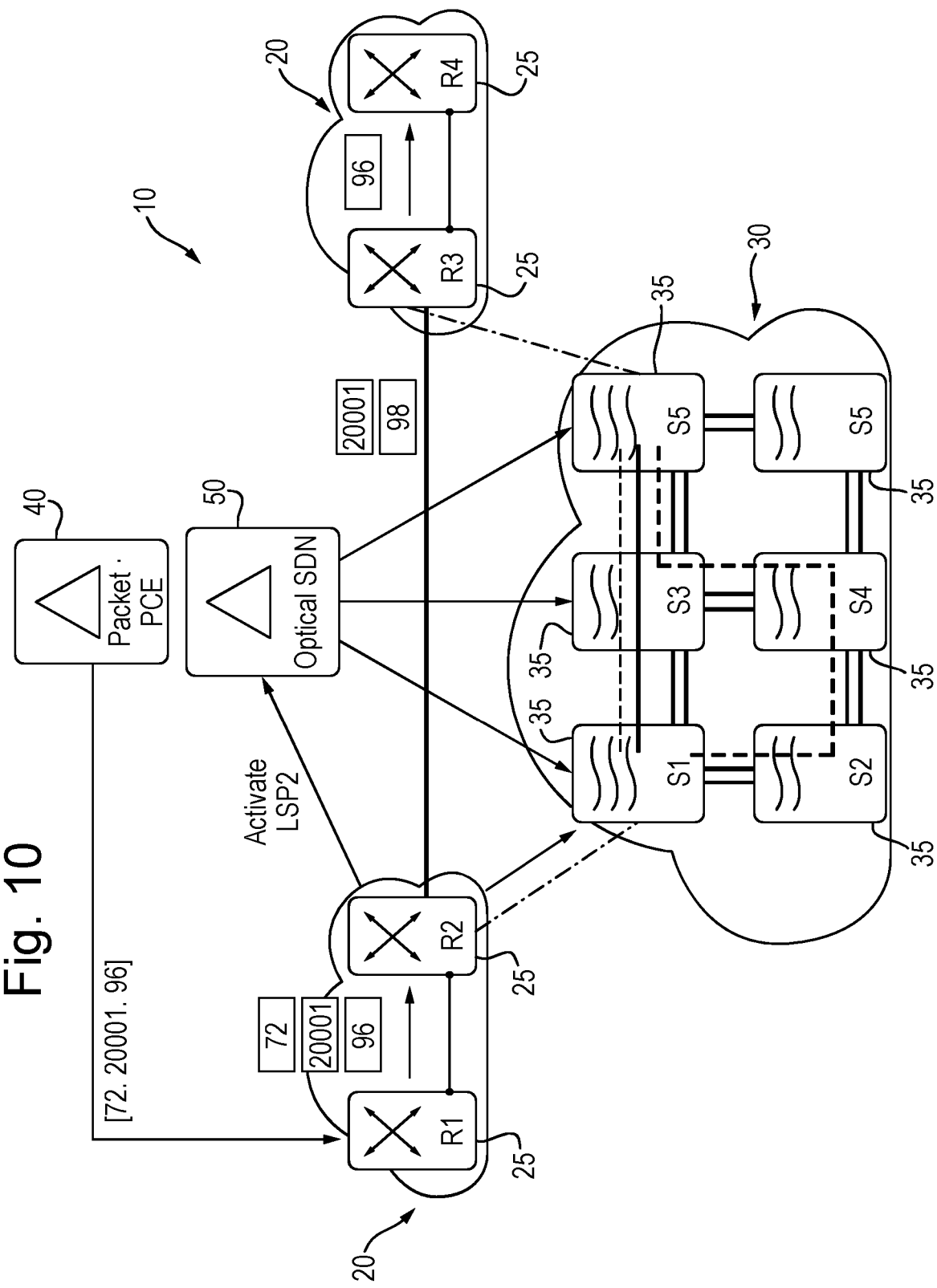
FIG. 10 is a multi-domain network diagram illustrating an alternative to the steps shown in FIG. 9.

As indicated in FIGS. 9 and 10, the PCE 40 may then collate a set of network segment identifiers which indicate the respective network segments of the determined path, and send an indication of these network segment identifiers (here 72, 20001, 96) to the ingress network node R1 25. The ingress network node R1 25 may then include these network segment identifiers (e.g. labels) in the data packets. These network segment identifiers are ordered according to the position of the respective network segments along the path, the first or outer label relating to the first network segment.

In this example, network node R1 25 retrieves or reads the outer label, 72, and forwards the data packets to network node R2 25, for example by an EMCP path if the label indicates a Node Segment.

When overlay network node R2 25 receives the data packets, it drops the outer label (72) and retrieves the next label, label 20001. As explained above, this label indicates an Adjacency Segment between overlay network nodes R2 and R3 25. The overlay network node R2 25 may thereby determine that this label (i.e. network segment identifier) indicates that the data packets should be routed over a pre-selected potential path (here LSP 2) through the server optical network domain 20. The overlay network node R2 25 further, in response, triggers the server network domain 20 to configure the pre-selected potential path.

For example, as shown in FIG. 9, where there is a UNI interface between overlay network node R2 25 and its optical border node S1 35, this trigger may be an instruction sent by the overlay network node R2 25 to the optical border node S1 35, for example a RSVP-TE signal. Or, as shown in FIG. 10, where the interface between overlay network node R2 25 and optical border node S1 35 is an API interface or other protocol interface, this trigger may comprise an instruction such as a command or message sent by the overlay network node R2 25 towards an optical network controller 50, for example a SDN optical network controller.

Once the potential optical path has been configured, and therefore a packet link is established between overlay network nodes R2 and R3 25, the overlay network node R2 25 may forward the data packets over the configured path to overlay network node R3 25. When overlay network node R3 25 receives the data packets, it then drops the outer label in the data packets (20001) and retrieves the next label, 96, and forwards the data packets accordingly to network node R4 25. For example, if label 96 indicates a Node Segment to network node R4 25, overlay network node R3 25 will forward the data packets to network node R4 25 according to a ECMP path.

Thus, advantageously, embodiments of the present invention enable Segment Routing to be used to route data packets through a multi-domain network where a server network domain comprises a connection-oriented technology, without having to initially preconfigure paths through the server network domain and thereby tie up server network resources.

Figure 11:
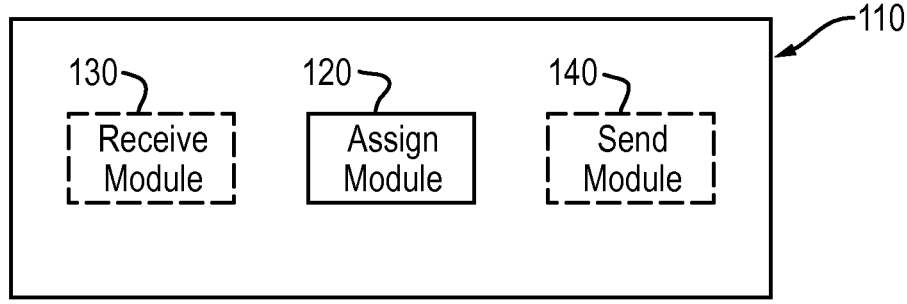
FIG. 11 is a schematic diagram showing apparatus according to an embodiment of the present invention.

FIG. 11 shows an apparatus 110 for enabling Segment Routing in a multi-domain network comprising a client network domain and a server network domain, where the client network domain is a packet network domain and the server network domain is a connected-oriented network domain, according to an embodiment of the present invention. This apparatus 110 may be configured to perform steps described above, for example the method described above with reference to the flow chart of FIG. 5.

The apparatus 110 may be comprised within a Path Computation Entity, and or a SDN packet network controller, although other embodiments are possible.

The apparatus 110 comprises an assignor module 120 configured to assign a network segment identifier to each of one or more potential paths through the server network domain between a pair of overlay network nodes in the client network domain, wherein the one or more potential paths are not pre-configured, and the or each network segment identifier is suitable for inclusion in one or more data packets to indicate to at least one of the pair of overlay network nodes a preselected network Segment Routing for the one or more data packets. The apparatus 110 may optionally further comprise a receive module 130 configured to receive an indication of one or more potential paths through the server network domain between a pair of overlay network nodes in the client network domain, and the assignor module 120 may be further configured to assign a network segment identifier to each of the indicated one or more potential paths. The apparatus 110 may optionally further comprise a send module 140 configured to send an indication of the network segment identifier assigned to each of the one of more potential paths through the server network domain to the at least one of the pair of overlay nodes in the client network domain.

The modules 120, 130, 140 described above with reference to FIG. 11 are functional units which may be implemented in hardware, software, firmware or any combination thereof. The modules may be integrated to any degree. In one embodiment, the modules are implemented as a computer program running on a processor.

Figure 12:
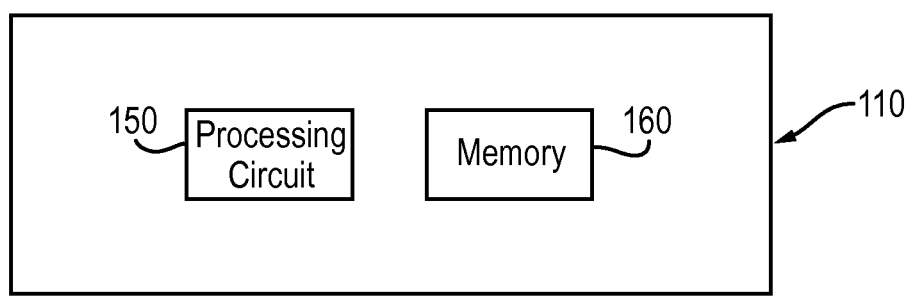
FIG. 12 is a schematic diagram showing apparatus according to an embodiment of the present invention.

An alternative way of describing the embodiment of FIG. 11 is shown in FIG. 12. In FIG. 11, the apparatus 110 comprises processing circuitry 150 and a memory 160, the memory containing instructions executable by the processing circuitry, whereby the apparatus is operative to assign a network segment identifier to each of one or more potential paths through the server network domain between a pair of overlay network nodes in the client network domain, wherein the one or more potential paths are not pre-configured and the or each network segment identifier is suitable for inclusion in one or more data packets to indicate to at least one of the pair of overlay network nodes a preselected network Segment Routing for the one or more data packets.

The apparatus 110 may further be operative to receive an indication of one or more potential paths through the server network domain between a pair of overlay network nodes in the client network domain, and assign a network segment identifier to each of the indicated one or more potential paths. The apparatus 110 may further be operative to inform the at least one of the pair of overlay nodes in the client network domain of the network segment identifier assigned to each of the one of more potential paths through the server network domain.

Figure 13:
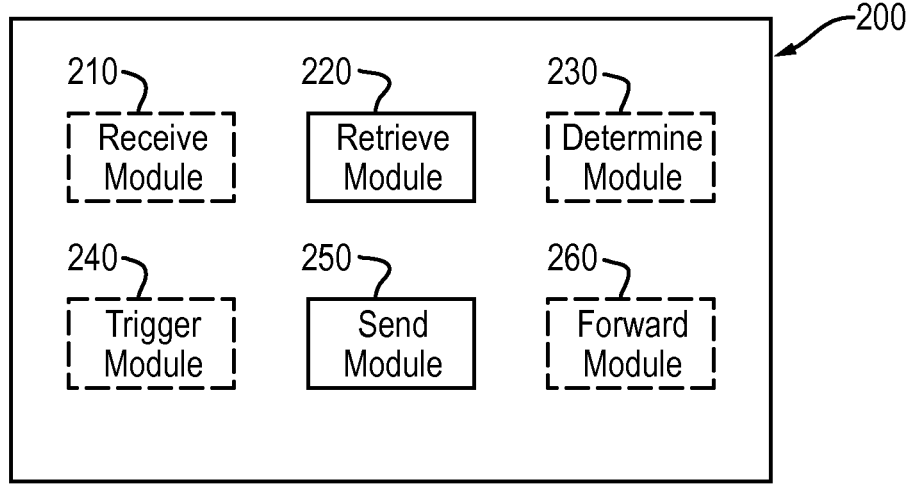
FIG. 13 is a schematic diagram showing an overlay packet node according to an embodiment of the present invention.

FIG. 13 shows an overlay network node 200 according to an embodiment of the present invention. The overlay node 200 may be configured to perform the method described above, for example with respect to FIG. 7.

In this embodiment, the overlay network node 200 comprises a receive module 210 configured to receive one or more data packets. The overlay node 200 further comprises a retrieve module 220 configured to retrieve a network segment identifier included in at least one of the one or more data packets, and a determination module 230 configured to determine that the network segment identifier indicates that the one or more data packets should be routed over a pre-selected potential path through the server network domain. The overlay node 200 further comprises a trigger module 240 configured to, based on the determination, trigger the server network domain to configure the pre-selected potential path through the server network domain.

Optionally, the overlay network node 200 further comprises a send module 250 whereby the overlay network node 200 is configured to trigger the server network domain to configure the pre-selected path through the server network domain by sending an instruction to a network node in the server network domain or to a server network domain controller. The overlay network node 200 may further comprise a forwarding module 260 configured to forward the one or more data packets over the configured pre-selected potential path.

Again, the modules 210 to 260 described above with reference to FIG. 13 are functional units which may be implemented in hardware, software, firmware or any combination thereof. The modules may be integrated to any degree. In one embodiment, the modules are implemented as a computer program running on a processor.

Figure 14:
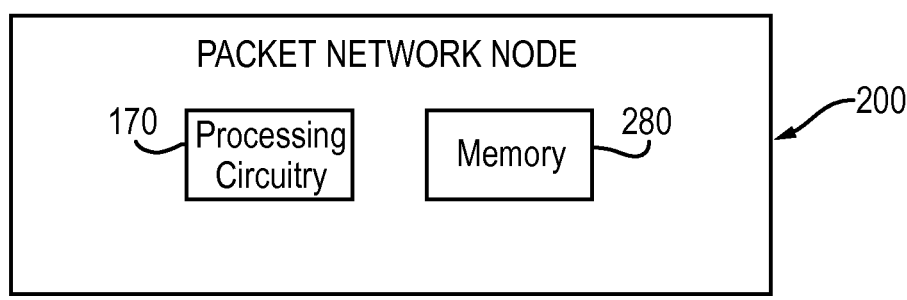
FIG. 14 is a further schematic diagram showing an overlay packet node according to an embodiment of the present invention.

FIG. 14 shows an overlay network node 200 according to an alternative embodiment of the present invention. The overlay network node 200 comprises processing circuitry 270 and a memory 280, the memory 280 containing instructions executable by the processing circuitry 270, whereby the overlay network node 200 is operative to receive one or more data packets and retrieve a network segment identifier included in at least one of the one or more data packets. The overlay network node 200 is further operative to determine that the network segment identifier indicates that the one or more data packets should be routed over a pre-selected potential path through the server network domain. The overlay network node 200 is further operative, based on the determination, to trigger the server network domain to configure the pre-selected potential path through the server network domain.

The overlay network node 200 may be operative to trigger the server network domain to configure the pre-selected path through the server network domain by sending an instruction to a network node in the server network domain or to a server network domain controller.

The overlay network node 200 may further be operative to forward the one or more data packets over the configured pre-selected potential path.

It should be noted that the term processing circuitry used herein includes any hardware capable of executing instructions and or program codes, e.g. a microprocessor such as a Central Processing Unit (CPU), a digital signal processor (DSP) or any other general-purpose or application specific processors. Furthermore, the term memory used herein includes any storage medium capable of storing instructions and or program codes, e.g. a magnetic storage medium, an optical storage medium, a semiconductor storage medium and any other volatile or non-volatile storage mediums.

The invention claimed is:

1. A method for enabling Segment Routing in a multi-domain network comprising a client network domain and a server network domain, wherein the client network domain is a packet network domain and the server network domain is a connection-oriented network domain, the method comprising:

assigning a network segment identifier to each of one or more potential paths through the server network domain between a pair of overlay network nodes in the client network domain, wherein the one or more potential paths are not pre-configured and each of the one or more potential paths is a potential optical Label Switched Path (LSP); and transmitting the assigned respective network segment identifies identifying the potential paths through the server network domain between the pair of overlay network nodes to at least one of the pair of overlay network nodes;

wherein:

a respective network segment identifier included in one or more data packets transmitted to a respective node of the pair of overlay network nodes indicates to the respective node a selected potential path through the server network domain for the one or more data packets; and the configuration of the selected potential path indicated by the respective segment identifier is triggered in response to receiving the data packets including the indication at the respective node of the pair of overlay network nodes.

2. The method according to claim 1, wherein assigning a network segment identifier to each of one or more potential paths through the server network domain between a pair of overlay network nodes in the client network domain comprises:

receiving an indication of one or more potential paths through the server network domain between a pair of overlay network nodes in the client network domain; and assigning a network segment identifier to each of the indicated one or more potential paths.

3. A method for routing data packets in a multi-domain network comprising a client network domain and a server network domain, wherein the client network domain is a packet network domain and the server network domain is a connection-oriented network domain, the method, in an overlay network node in the client network domain, comprising:
  receiving one or more data packets at an overlay network node in the client network domain;
  retrieving a network segment identifier included in at least one of the one or more data packets;
  determining that the network segment identifier indicates that the one or more data packets should be routed over a pre-selected potential path through the server network domain, wherein the pre-selected potential path is a potential optical Label Switched Path (LSP);
  based on determining the pre-selected potential path is indicated by the network segment identifier, triggering the server network domain to configure the pre-selected potential path through the server network domain; and
  causing the transmission of the one or more data packets through the server network domain via the configured pre-selected potential path.

4. The method according to claim 3, wherein the server network domain is one of an optical network domain, an Optical Transport Network, OTN, network domain, a Synchronous Digital Hierarchy, SDH, network domain or a connection oriented packet network domain.

5. The method according to claim 4 further comprising forwarding the one or more data packets over the configured pre-selected potential path.

6. The method according to claim 4, wherein triggering the server network domain to configure the pre-selected path through the server network domain comprises:
  sending an instruction to a network node in the server network domain or to a server network domain controller.

7. The method according to claim 3, wherein the or each network segment identifier is a label compatible with Segment Routing.

8. Apparatus for enabling Segment Routing in a multi-domain network comprising a client network domain and a server network domain, wherein the client network domain is a packet network domain and the server network domain is a connected-oriented network domain, the apparatus comprising processing circuitry and a memory, the memory containing instructions executable by the processing circuitry, whereby the apparatus is operative to:
  assign a network segment identifier to each of one or more potential paths through the server network domain between a pair of overlay network nodes in the client network domain, wherein the one or more potential paths are not pre-configured and each of the one or more potential paths a potential optical Label Switched Path (LSP); and
  transmitting the assigned respective network segment identifiers identifying the selected potential paths through the server network domain between the pair of overlay network nodes to at least one of the pair of overlay network nodes;
  wherein:
    a respective network segment identifier Included in one or more data packets transmitted to a respective node of the pair of overlay network nodes indicates to the respective node a selected potential path through the server network domain for the one or more data packets; and
    the configuration of the selected potential path indicated by the respective segment identifier is triggered in response to receiving the data packets including the indication at the respective node of the pair of overlay network nodes.

9. The apparatus according to claim 8, wherein the apparatus is operative to:
  receive an indication of one or more potential paths through the server network domain between a pair of overlay network nodes in the client network domain; and
  assign a network segment identifier to each of the indicated one or more potential paths.

10. The apparatus according to claim 8 wherein the apparatus is comprised within a path computation entity and or a network controller.

11. An overlay network node for a client network domain in a multi-domain network comprising a client network domain and a server network domain, wherein the client network domain is a packet network domain and the server network domain is a connection-oriented network domain, the overlay network node comprising processing circuitry and a memory, the memory containing instructions executable by the processing circuitry, whereby the overlay network node is operative to:
  receive one or more data packets at an overlay network node in the client network domain;
  retrieve a network segment identifier included in at least one of the one or more data packets;
  determine that the network segment identifier indicates that the one or more data packets should be routed over a pre-selected potential path through the server network domain, wherein the pre-selected potential path is a potential optical Label Switched Path (LSP);
  based on determining the pre-selected potential path is indicated by the network segment identifier, to trigger the server network domain to configure the pre-selected potential path through the server network domain; and
  causing the transmission of the one or more data packets through the server network domain via the configured pre-selected potential path.

12. The overlay network node according to claim 11, wherein the overlay network node is operative to trigger the server network domain to configure the pre-selected path through the server network domain by sending an instruction to a network node in the server network domain or to a server network domain controller.

13. The overlay network node according to claim 11, wherein the overlay network node is further operative to forward the one or more data packets over the configured pre-selected potential path.

14. A non-transitory computer readable medium comprising a computer program configured to perform, when run on a computer, the method according to claim 1.

15. A non-transitory computer readable medium comprising a computer program configured to perform, when run on a computer, the method according to claim 3.

* * * * *